United States Patent
Strub et al.

(10) Patent No.: US 9,719,819 B2
(45) Date of Patent: Aug. 1, 2017

(54) VORTEX FLOW SENSOR FOR A VORTEX FLOW TRANSDUCER HAVING A FLANGE SHAPED SUPPORT DEVICE FOR SUPPORTING A MEMBRANE IN A HOUSING

(71) Applicant: Endress + Hauser Flowtec AG, Reinach (CH)

(72) Inventors: Andreas Strub, Weil am Rhein (DE); Natalie Witkowski, Wehr (DE); Dominique Wiederkehr, Hagenthal-le-bas (FR); Sascha Kamber, Ephingen (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 14/893,130

(22) PCT Filed: Apr. 22, 2014

(86) PCT No.: PCT/EP2014/058105
§ 371 (c)(1),
(2) Date: Nov. 23, 2015

(87) PCT Pub. No.: WO2014/187629
PCT Pub. Date: Nov. 27, 2014

(65) Prior Publication Data
US 2016/0123783 A1    May 5, 2016

(30) Foreign Application Priority Data
May 24, 2013    (DE) ........................ 10 2013 105 363

(51) Int. Cl.
*G01F 1/32*    (2006.01)
(52) U.S. Cl.
CPC .......... *G01F 1/3218* (2013.01); *G01F 1/3209* (2013.01); *G01F 1/3263* (2013.01)

(58) Field of Classification Search
CPC ..................................................... G01F 1/3209
See application file for complete search history.

(56) References Cited

U.S. PATENT DOCUMENTS

| 4,552,023 A | 11/1985 | Bowman |
| 4,706,503 A * | 11/1987 | Kamentser ............ G01F 1/3209 |
| | | 73/861.24 |

(Continued)

FOREIGN PATENT DOCUMENTS

| DE | 149571 | 7/1981 |
| DE | 10229703 A1 | 1/2004 |

(Continued)

OTHER PUBLICATIONS

German Search Report, German PTO, Munich, DE, Feb. 18, 2014.
(Continued)

*Primary Examiner* — Harshad R Patel
(74) *Attorney, Agent, or Firm* — Bacon & Thomas, PLLC

(57) ABSTRACT

A vortex flow transducer for measuring the flow velocity of a fluid flowing in a measuring tube as well as to a vortex flow sensor for the vortex flow transducer. In such case, the vortex flow sensor includes a housing having a central axis and a connecting section, on which a shoulder is embodied, which has a bearing area. In a plane of the shoulder a membrane is arranged, whose edge is positioned over the bearing area and is axially spaced therefrom. The vortex flow sensor includes, furthermore, a flange shaped support system having a radial edge section and a cylindrical axial section, wherein the radial edge section lies with its surface against the shoulder of the platform and the cylindrical axial section extends parallel to the central axis, so that the membrane is supported against the support system upon application of a predetermined pressure on the membrane.

8 Claims, 2 Drawing Sheets

(56) References Cited

U.S. PATENT DOCUMENTS

| | | | | |
|---|---|---|---|---|
| 4,791,818 A * | 12/1988 | Wilde | ................... | G01F 1/3263 |
| | | | | 73/861.24 |
| 4,926,695 A * | 5/1990 | Kleven | ................ | G01F 1/3263 |
| | | | | 73/861.24 |
| 6,003,384 A * | 12/1999 | Frohlich | ............... | G01F 1/3263 |
| | | | | 73/861.22 |
| 6,352,000 B1 * | 3/2002 | Getman | ................ | G01F 1/3263 |
| | | | | 73/861.22 |
| 7,150,197 B2 | 12/2006 | Hegner | | |
| 2003/0061887 A1 * | 4/2003 | Koudal | ................ | G01F 1/3209 |
| | | | | 73/861.22 |
| 2004/0216532 A1 * | 11/2004 | Koudal | ................ | G01F 1/3209 |
| | | | | 73/861.22 |
| 2008/0072686 A1 * | 3/2008 | Hoecker | ............... | G01F 1/3209 |
| | | | | 73/861.22 |
| 2011/0154913 A1 | 6/2011 | Konyukhov | | |

FOREIGN PATENT DOCUMENTS

| | | |
|---|---|---|
| EP | 0094446 A1 | 11/1983 |
| EP | 0240100 A1 | 10/1987 |
| EP | 0841545 B1 | 5/1998 |
| EP | 1010973 A1 | 6/2000 |
| GB | 2186376 A | 8/1987 |

OTHER PUBLICATIONS

International Search Report, EPO, The Netherlands, Jun. 30, 2014.
English Translation of the International Preliminary Report on Patentability, WIPO, Geneva, CH, Dec. 3, 2015.

* cited by examiner

VORTEX FLOW SENSOR FOR A VORTEX FLOW TRANSDUCER HAVING A FLANGE SHAPED SUPPORT DEVICE FOR SUPPORTING A MEMBRANE IN A HOUSING

TECHNICAL FIELD

The invention relates to a vortex flow measuring sensor and to a vortex flow measuring transducer for measuring flow velocity of a fluid.

BACKGROUND DISCUSSION

Vortex flow measuring transducers are used for exact measurements of flow velocity or volume flow of a fluid flowing in a flow direction. German Patent, DE 10 2009 001 526 A1 describes such a measuring transducer having a measuring tube, wherein the measuring tube contains a bluff body, which is upstream of a vortex sensor. The bluff body serves for producing a Kármán vortex street in the fluid. Pressure fluctuations thereof are transformed by a downstream vortex sensor into an electrical signal, wherein the frequency of the measured vortices is proportional to the volume flow.

Vortex flow measuring sensors (or also vortex sensors for short) for such measuring transducers are known from the state of the art, among others, from European Patent, EP 0 841 545 B1. Described therein is a capacitive vortex sensor, which is inserted into a measuring tube and used there for measuring flow velocity or also volume flow. Essentially, the vortex sensor comprises a housing, within which is arranged a membrane, on whose side, which is facing the fluid flowing in the measuring tube, a sensor paddle is secured. Arranged on the side of the membrane facing away from the fluid is a capacitive electrode arrangement. One electrode is, in such case, connected with the membrane. The sensor paddle is caused to oscillate and is deflected by the vortices of the Kármán vortex street. This deflection transfers proportionally to the electrode arrangement, whereby a capacitance change occurs, which can be sensed.

Vortex sensors have, as a rule, a limited pressure range, in which measurement is possible. The upper limit of the pressure range is determined by allowable maximum values of membrane stresses, respectively bending stresses, which act on membrane and paddle. In order to expand the pressure range to higher pressure values, high strength materials are applied, which can withstand higher bending stresses. However, these materials, such as, for example, high strength steels, are expensive and complex to process.

Known from the state of the art of pressure sensors is an overload protection for pressure difference sensors equipped with membranes. Thus, an overload protection system for pressure sensors is described in "Overload-Resistant Pressure Sensor In the Nominal Range of 10 mbar(1 kPa)"-T. Kober, R. Werthschützky, Institute of Electromechanical Design, Technische Universität (Technical University), Darmstadt, Germany, Proc. Eurosensors XXIV, Sep. 5-8, 2010, Linz, Austria as well as in "Mikromechanischer Überlastschutz für Drucksensoren durch strukturierte Gegenlager aus Glas (Micromechanical Overload Protection for Pressure Sensors Using Structured Counterbearings of Glass)"-T. Kober, R. Werthschützky, Sensoren and Messsysteme (Sensors and Measuring Systems) 2010, Berlin: VDE Verlag GmbH (publisher), ISBN 978-3-8007-3260-9. Described therein is a micromechanical overload protection system produced from thermally treated glass for use in pressure difference sensors. Introduced into a silicon wafer by laser machining are defined cavities. Then, a glass wafer and the prepared silicon wafer are positioned next to one another. Thermal treatment causes the glass to form into the cavities. Then a silicon measuring plate is positioned, which serves as the pressure membrane. In the case of an over-pressure loading from above, the silicon measuring plate moves from its resting position downwards until it touches the prepared glass wafer, which protects it from breaking.

Disadvantageous in the aforementioned state of the art, however, is that in the case of overloading of the silicon membrane, thus after a certain pressure, the membrane lies completely against the overload protection. While the membrane can thereby be effectively protected against the overload and, thus, from damage, still, the membrane can then no longer register oscillations. The measuring sensor formed with the membrane can no longer produce measurement signals.

SUMMARY OF THE INVENTION

Starting from this state of the art, an object of the present invention is simply and cost effectively to expand the pressure range of a vortex sensor.

This object is achieved by an apparatus, comprising: a housing having a central axis and a connecting section, on which a shoulder is embodied, said shoulder has a bearing area; a membrane arranged in a plane of said shoulder, whose edge is positioned over said bearing area and is axially spaced therefrom; and a flange shaped support device having a radial edge section and a cylindrical axial section, wherein: said radial edge section lies with its surface against said shoulder of said housing; and said cylindrical axial section extends parallel to said central axis, so that said membrane is supported against said support device upon application of a predetermined pressure on said membrane.

Another object is to provide a vortex flow measuring transducer, which in comparison to previously known measuring transducers can measure a higher pressure range. This is achieved by the vortex flow measuring transducer for measuring flow velocity of a fluid flowing in a measuring tube, which comprises: connected with the measuring tube, a bluff body, which serves for producing Kármán vortices; and responding to pressure fluctuations produced by the vortices; and a capacitive vortex sensor, which is installed downstream from said bluff body in a wall side opening of the measuring tube, said capacitance comprises a vortex flow sensor for a vortex flow transducer for measuring flow velocity of a fluid through by a measuring tube, comprising: a housing having a central axis and a connecting section, on which a shoulder is embodied, said shoulder has a bearing area; a membrane arranged in a plane of said shoulder, whose edge is positioned over said bearing area and is axially spaced therefrom; and a flange shaped support device having a radial edge section and a cylindrical axial section, wherein: said radial edge section lies with its surface against said shoulder of said housing; and said cylindrical axial section extends parallel to said central axis, so that said membrane is supported against said support device upon application of a predetermined pressure on said membrane.

A form of embodiment of the invention provides a vortex flow sensor for a vortex flow transducer for measuring flow velocity of a fluid flowing through a measuring tube. The vortex flow sensor includes an electrode housing having a central axis and a connecting section, on which a shoulder can be embodied, which has a bearing area. In such case, there can be arranged in a plane of the shoulder a membrane, whose edge is positioned over the bearing area and is axially spaced therefrom. The vortex flow sensor includes, furthermore, a flange shaped support device having a radial edge section and a cylindrical axial section, wherein the radial edge section contacts the shoulder of the housing with its surface and the cylindrical axial section can extend parallel to the central axis, so that the membrane is supported against the support device upon application of a predetermined pressure on the membrane.

The support device serves for overload protection. Advantageously, the membrane can in the case of a high pressure loading, which exceeds the predetermined pressure range, which the membrane can withstand without damage, partially contact the flange shaped support device. This leads to the fact that the sensor membrane can withstand higher pressure and simultaneously remains movable in the non-supported region. By lessening the movable region, the sensitivity of the sensor does decrease, but this is partially compensated due to the higher vortex pressure. The higher vortex pressure arises, in such case, from the higher density in the case of higher pressure of the process.

According to the invention, it can be provided that an outer diameter of the cylindrical axial section of the support device about corresponds to an inner diameter of an electrode section of the electrode housing, so that the support device can be held within the electrode housing via a press fit or a shrink fit. For such purpose, the outer diameter of the support device plus a tolerance range should correspond to the inner diameter of the cylindrical electrode housing in such section. The support device can, thus, in the case of the manufacture of the vortex sensor, be installed simply and rapidly into the electrode housing. The radial edge section cares, in such case, for a good seating.

Furthermore, a form of embodiment of the invention can provide that the support device surrounds along the central axis a section of a sleeve-shaped, first electrode arrangement, wherein the first electrode arrangement connects with the first surface of the membrane, preferably can be connected via a transition piece. In this regard, the invention provides advantageously that the support device has a central axial bore, whose diameter is so dimensioned that the sleeve shaped, first electrode arrangement passes through the bore, without contacting an inner surface of the bore. Such does not interfere with the functioning of the vortex sensor in the normal pressure range, since the membrane must only be supported in the increased pressure range. The accuracy of measurement of the sensor is not influenced by the installation of the support device.

Preferably, the vortex flow sensor can be a capacitive vortex flow sensor, also called a DSC (digital switched capacitor) sensor.

In such case, the first electrode arrangement can be connected with the first surface of the membrane via a transition piece, wherein the first electrode arrangement can have one or more electrode(s). The first electrode arrangement and the membrane can, thus, be surrounded by the electrode housing. The electrode housing can have a second electrode arrangement having at least one counter-electrode. In such case, the second electrode arrangement can surround one or more section(s) of the first electrode arrangement, preferably spaced from the support device. In the case of this sensor type, swinging movements of the paddle, i.e. of the swingable section, are converted by means of two electrically connected capacitances into differential electrical charge changes and evaluated by a suitable measuring electronics. Thus, the swinging movements of the paddle can be transmitted to the sleeve-like first electrode arrangement as a central electrode, which can be embodied as a direct lengthening of the paddle. Furthermore, in the second electrode arrangement, the outer counter-electrode can be provided, decoupled from pressure fluctuations and formed of two half shells, which can be arranged concentrically to the sleeve-shaped, first electrode arrangement.

According to the invention, it can be provided for an embodiment of the membrane that the membrane is circular and has a surrounding, ring-shaped, thickened edge. The thickened edge pushes into the shoulder of the electrode housing and can be sealed fluid-tightly by means of an additional seal. The membrane can oscillate uniformly and is effectively supported at its edge. Additionally, such forms of construction are easily manufacturable.

Arranged advantageously on the second surface of the membrane can be a bending-stiff, thin, sensor paddle, which extends along the central axis of the vortex flow sensor away from the second surface of the membrane, wherein the sensor paddle has two planar main surfaces. The main surfaces form a narrow wedge, so that the paddle does not disturb the fluid flow, but, instead, is only caused to oscillate by the vortex street. "Narrow" means here that the sensor paddle is so dimensioned that the pressure fluctuations caused by the vortex are transmitted easily to the paddle, which begins to oscillate. In such case, the dimensions can be matched to the corresponding pressure range to be measured. The bending stiffness results from the choice of material of the sensor paddle, for which preferably steel can be used, as will be explained below.

The membrane and parts connected with it can, furthermore, be embodied advantageously with one-piece construction, wherein the sensor component formed thereby can be of steel. In this regard, the individual parts, membrane, paddle, edge and first electrode arrangement, can be individually produced and then welded together. Advantageously, also the electrode housing and the support device can be manufactured of the same steel, whereby the parts have an almost equal thermal expansion. Stresses within the component can be prevented in this way. Preferably, 1.4301 or 1.4435 steel is used, which, as austenitic, stainless steel, is especially corrosion resistant. Additionally, these types of steel can also be applied at higher operating temperatures of up to 450° C. without problem. However, also other steels or metal alloys can be used for manufacture of the vortex sensor. The material can be selected as a function of the pressure range to be reached, so that, in given cases, especially high strength steels do not need to be used.

The invention relates, furthermore, to a vortex flow transducer for measuring flow velocity of a fluid flowing in a measuring tube, wherein the vortex flow transducer includes, connected with the measuring tube, a bluff body, which serves for producing Kármán vortices, and, responding to pressure fluctuations produced by the vortices, a capacitive vortex flow sensor, which is installed downstream from the bluff body in a wall side opening of the measuring tube.

In such case, it can especially be provided that the electrode housing can be so bending-resistantly dimensioned that the electrode housing does not bend in the case of a greatest allowable acceleration acting on the measuring tube.

The vortex sensor can be installed in a measuring transducer as shown, among others, in DE 10 2009 001 526 A1 or also EP 841 545 B1. Essentially, the vortex sensor can be inserted into a bore of the measuring tube, wherein it should be sealed fluid- and pressure-tightly, in order that an exact measuring of the flow velocity can occur.

Other forms of embodiment, as well as some of the advantages associated with these and additional forms of embodiment, will now be explained in the following detailed description with reference to the figures of the drawing. Features or parts, which are the same, essentially equal or very similar, can bear the same reference characters.

DETAILED DISCUSSION IN CONJUNCTION WITH THE DRAWINGS

An apparatus of the invention is or includes a vortex sensor 1, whose measuring range can be expanded by application of an essentially flange shaped support device 8.

Figure 1:
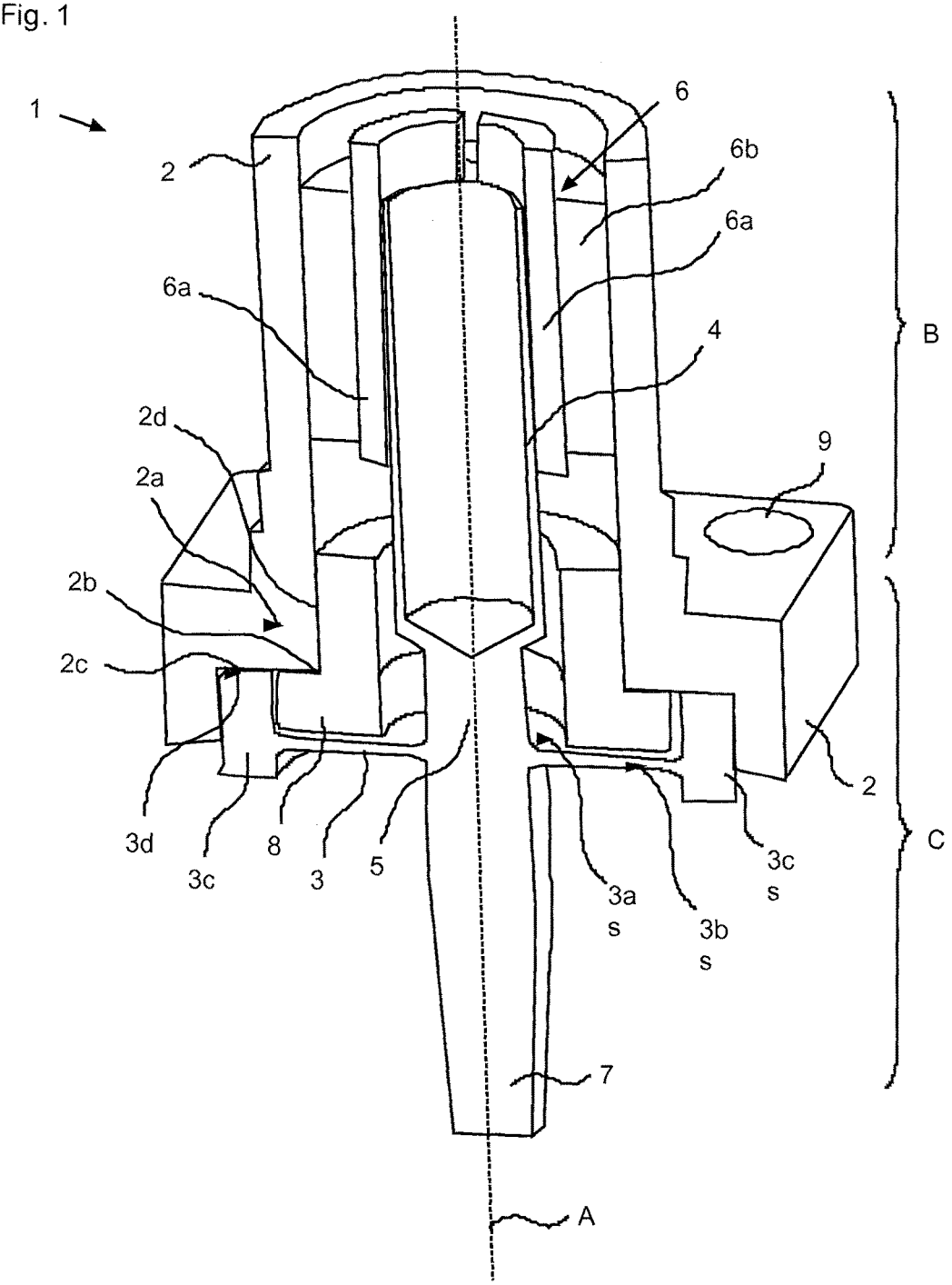
FIG. 1 is a longitudinal section of a vortex sensor of the invention.

The vortex sensor 1 shown in FIG. 1 is a capacitive vortex sensor, which has an electrode housing 2, which protectively encloses first and second measuring electrode arrangements. Electrode housing 2 is embodied rotationally symmetrically along its central axis A, wherein both inner and outer diameters are smaller in an electrode section B than in a membrane section C. Provided as a transition between the two sections B, C is a shoulder 2a. Shoulder 2a forms in the interior of the electrode housing 2 a surrounding, inwardly directed edge 2b.

Electrode housing 2 is embodied to include in its membrane section C a connection region, in which bores 9 are provided, which serve for connecting the vortex flow sensor 1 with a measuring transducer or a measuring tube. Used for the connecting can be conventional connecting means, such as screws, rivets or the like.

Arranged furthermore within the electrode housing 2 is a sensor membrane 3. Membrane 3 is circularly embodied and includes a first surface 3a and a second surface 3b. The first surface 3a is, in such case, facing the interior of the electrode housing 2, while the second surface 3b faces away from the electrode housing 2. In an edge region, membrane 3 includes a thickened edge 3c, which is embodied rectangularly in longitudinal section. Edge 3c has, in such case, a greater height than the thickness of the membrane 3. A surface 3d of the edge 3c faces the interior of the electrode housing 2 and lies against a bearing area 2c of the electrode housing 2. Arranged between edge 3c and bearing area 2c in the electrode housing 2 can be a weld seam or a seal, in order to seal off the capacitive vortex sensor 1 as such fluid-tightly.

Secured on the first surface 3a of the membrane 3 is a sleeve shaped, first electrode arrangement 4, which includes an electrode (not shown).

Provided at the transition between the first electrode arrangement 4 and the membrane 3 is a solid transition piece 5, which connects the first electrode arrangement 4 with the surface 3a of the membrane 3. In such case, the transition piece 5 is approximately so dimensioned, for instance, that the resonant frequency of the capacitor is sufficiently high.

The electrode section B of the electrode housing 2 surrounds the first electrode arrangement 4 completely and includes a second electrode arrangement 6, which on its part includes two counter-electrodes 6a and an insulating material 6b. The counter-electrodes 6a are, in such case, embodied as a half shells.

Secured on the second surface 3b of the membrane 3 is a sensor paddle 7, which has two main surfaces (not shown), which incline toward a tip of the paddle 7 and, thus, form a narrow wedge.

Figure 2:
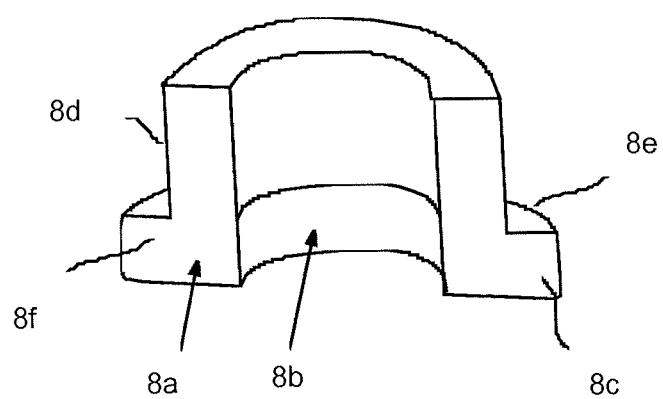
FIG. 2 is a support device in longitudinal section.

Provided between the membrane 3 and the electrode housing 2 is, furthermore, a flange shaped support device 8, which is also shown in FIG. 2 in longitudinal section. Support device 8 is essentially cylindrically embodied, wherein it has in a lower third an angled portion 8a. The angled portion 8a is formed, in such case, of two sections arranged perpendicularly to one another, a radial, edge section 8c and a cylindrical, axial section 8d.

Along its central, longitudinal axis, the support device 8 includes a traversing, central, axial bore 8b, whose inner diameter is dimensioned in such a manner that the first electrode arrangement 4 is arranged contactless within the bore 8b (see also FIG. 1) and the inner surface of the bore 8b is spaced from the outer surface of the first electrode arrangement 4. An outer diameter of the upper two thirds corresponds, in such case, to an inner diameter of the electrode housing 2, so that the support device 8 is held in the electrode housing 2 by a press fit.

In order that the support device 8 is held tightly in the electrode housing 2, the cylindrical axial section 8d is embodied longer than the radial edge section 8c. The cylindrical axial section 8d lies, in such case, with its outside on an axial bearing area 2d on the inner side of the electrode housing 2. The radial edge section 8c comes with its surface 8e, furthermore, to lie against the bearing area 2c of the electrode housing 2. The angled portion 8a thus encloses the edge 2b, which is formed by the shoulder 2a, wherein the vertex 8f of the angled portion 8a directly contacts the edge 2b.

For correct positioning of the support device 8 in the electrode housing 2, the support device 8 can be pressed into the electrode housing 2. In this regard, the outer diameter of the axial section 8d is, for instance, about in the order of magnitude of the inner diameter of the electrode section B of the electrode housing 2, so that a press fit is provided.

Comparative measurements of vortex sensors 1 with and without support device 8 have shown in this regard: The highest comparison stress of the membrane 3 supported by means of the support device 8 lies at 160 bar while the highest comparison stress for an unsupported membrane 3 lies at 40 bar.

Membrane 3 lies in the case of pressures above 40 bar on the overload protection, whereby the stress in the middle of the membrane 3 lessens at higher pressure. On the other hand, the stress increases at the edge of the membrane 3; the stress can, however, not be higher than the maximum stress in the unsupported membrane 3 at 40 bar. If the membrane 3 is lying on the support device 8, the sensitivity of the paddle 7 is lessened, since the oscillating membrane surface is reduced by the bearing area, which equals the surface of the support device 8. Therefore, a greater force must act on the paddle 7, in order to achieve a deflection of the first electrode arrangement 4. However, the vortex pressure acting on the paddle 7 rises in proportion to the density of the fluid. The density increases with rising pressure especially in the case of compressible media. In this way, the lessening of the sensitivity can be compensated. The deflection of the cylindrical sleeve, i.e. the first electrode arrangement 4 in the case of the supported membrane 3 in the higher pressure range at, for instance, 160 bar is in the case of equal flow of fluid of similar size as the deflection in the case of the non=supported membrane at 40 bar. Membrane 3 is, thus, effectively supported.

Support device 8 enables use of the membrane 3 up to a pressure of, for instance, 250 bar. In such case, the measured stresses are, however, higher than in the case of the unsupported membrane 3, yet they are still under the specified limit of 410 MPa for secondary stresses.

The invention claimed is:

1. A vortex flow sensor for a vortex flow transducer for measuring flow velocity of a fluid through by a measuring tube, comprising:
    a housing having a central axis and a connecting section, on which a shoulder is embodied, said shoulder has a bearing area;
    a membrane arranged in a plane of said shoulder, whose edge is positioned over said bearing area and is axially spaced therefrom; and
    a flange shaped support device having a radial edge section and a cylindrical axial section, said radial edge section having an annular front surface facing away from said cylindrical section, an annular rear surface facing away from said front surface and a circumferential surface extending between said front surface and said rear surface wherein:
    said radial edge section of said flange shaped support device lies with rear surface against said bearing area of said shoulder of said housing; and
    said cylindrical axial section extends parallel to said central axis within said housing, so that said membrane is supported against an outer circumferential edge of said support device upon application of a predetermined pressure on said membrane.

2. The vortex flow sensor as claimed in claim 1, wherein:
said housing includes an electrode section; and
an outer diameter of said cylindrical axial section of said support device corresponds to an inner diameter of said electrode section of said housing, so that said support device is held within said housing via a press fit.

3. The vortex flow sensor as claimed in claim 1, wherein:
said support device surrounds along said central axis a section of a sleeve-shaped, first electrode arrangement, which connects with a first surface of said membrane, via a transition piece.

4. The vortex flow sensor as claimed in claim 3, wherein:
said support device has a central axial bore, whose diameter is so dimensioned that said sleeve shaped, first electrode arrangement passes through said bore, without contacting an inner surface of said bore.

5. The vortex flow sensor as claimed in claim 3, wherein:
the vortex flow sensor is a capacitive vortex flow sensor;
said housing has a second electrode arrangement having at least one counter-electrode; and
said second electrode arrangement surrounds at least one section of said first electrode arrangement, spaced from said support device.

6. The vortex flow sensor as claimed in claim 3, wherein:
there is arranged on a second surface of said membrane a bending-stiff, thin, sensor paddle, which extends along said central axis of the vortex flow sensor away from said second surface of said membrane; and
said sensor paddle has two planar main surfaces.

7. The vortex flow sensor as claimed in claim 1, wherein:
said membrane is circular and has a surrounding, ring-shaped, thickened edge.

8. A vortex flow measuring transducer for measuring flow velocity of a fluid flowing in a measuring tube, comprising:
    connected with the measuring tube, a bluff body, which serves for producing Kármán vortices; and responding to pressure fluctuations produced by the vortices; and
    a capacitive vortex sensor, which is installed downstream from said bluff body in a wall side opening of the measuring tube, said capacitive vortex sensor comprises:
    a vortex flow sensor for a vortex flow transducer for measuring flow velocity of a fluid flow through by a measuring tube, said measuring tube comprising: a housing having a central axis and a connecting section, on which a shoulder is embodied, said shoulder has a bearing area; a membrane arranged in a plane of said shoulder, whose edge is positioned over said bearing area of said shoulder and is axially spaced therefrom; and a flange shaped support device having a radial edge section and a cylindrical axial section, said radial edge section having an annular front surface facing away from said cylindrical section, an annular rear surface facing away from said front surface and a circumferential surface extending between said front surface and said rear surface wherein:
    said radial edge section of said flange shaped support device lies with rear surface against said bearing area of said shoulder of said housing; and
    said cylindrical axial section of said flange shaped support device extends parallel to said central axis within said housing, so that said membrane is supported against an outer circumferential edge of said flange shaped support device upon application of a predetermined pressure on said membrane.

* * * * *